Nov. 28, 1944.  A. V. HOWSON ET AL  2,363,964
EXTENSOMETER
Filed Dec. 14, 1940  5 Sheets-Sheet 1

Nov. 28, 1944.  A. V. HOWSON ET AL  2,363,964
EXTENSOMETER
Filed Dec. 14, 1940   5 Sheets-Sheet 2

Nov. 28, 1944.  A. V. HOWSON ET AL  2,363,964
EXTENSOMETER
Filed Dec. 14, 1940  5 Sheets-Sheet 5

Fig. 8.

INVENTORS.
A. V. Howson
+ N. S. Reed
BY
Stebbins + Blenko
ATTORNEYS.

Patented Nov. 28, 1944

2,363,964

UNITED STATES PATENT OFFICE 2,363,964

EXTENSOMETER

Arthur Victor Howson and Neville Stanley Reed, London, England, assignors to Callender's Cable & Construction Company Limited, London, England, a British company Application December 14, 1940, Serial No. 370,210
In Great Britain December 23, 1939

15 Claims. (Cl. 88—14)

This invention relates to extensometers which are particularly suitable for measuring large extensions, such, for instance, as occur in the tensile testing of rubber. In a usual method of making such tests two marks, which on the unstretched test piece are a standard distance apart (usually two inches), have to be observed during stretching, particularly with the intention of noting their distance apart when the test piece breaks. As usually practised at present, the observation of the marks is effected by holding a ruler alongside the sample and moving it so as to keep the zero point opposite the top mark. When the sample breaks the position of the bottom mark is noted. In this procedure it is necessary to observe two moving points, which may be as far as 15 inches apart and which reach their maximum velocity of separation just before the sample breaks. It is, therefore, not practicable to ensure that the reading is accurate; an error of half an inch is not uncommon using a single operator, but this error can be somewhat reduced by using two operators, one to observe the zero end of the rule and the other the position of the other mark. When the sample breaks the ends of rubber fly apart and outwards and may strike the hand of the operator. This movement also prevents the existence of any record of the maximum extension.

By the present invention we provide an optical device which avoids the necessity of a single operator observing two points that are a large distance apart and so dispenses with the need for two operators, which at the same time provides the possibility of greater accuracy and which also provides a record of the final positions reached and permits of the operator being at a safe distance from the test piece. The device according to the invention for facilitating the observation of the behaviour of the test piece comprises a system of reflecting surfaces arranged to bring the images of the two reference marks into view in close and defined proximity, one or more of the reflecting surfaces being made adjustable under the control of the operator, so that by such control the defined relationship of the images may be easily maintained during the separation of the marks, the position of the control at the end of the test indicating the maximum extension. The adjustment of one or more of the reflecting surfaces may be an angular adjustment or a linear adjustment in a line substantially parallel with the direction of extension. In the former case the device may be of two kinds. It may comprise a stationary eyepiece and two mirrors, one for each mark, both of which are adjusted simultaneously during the test so as to keep the two images in view in the eye-piece or it may comprise a mirror which is adjusted angularly and an eye-piece which is moved linearly, i. e. in a line parallel with the test piece so that the operator can make in it a direct observation of one of the marks in conjunction with a reflected observation of the other mark. The device may also be of two kinds in the case where the adjustment of the one or more reflecting surfaces is linear, not angular. In the one type two mirrors are provided, one for each mark, which are adjusted in a linear but not in an angular direction simultaneously during the test so as to keep the two images in view in a stationary eye-piece. In the other type the eye-piece is capable of linear movement, so that the operator can make in it a direct observation of one of the marks, observation of the other mark being maintained by linear movement of a mirror. In all cases the device may also provide for the automatic marking of a series of points on a stress-strain curve in a manner to be described hereinafter.

To enable the invention to be more fully understood examples of both the angular and the linear adjustment types of the device will now be described with reference to the accompanying drawings wherein.

Figure 1:
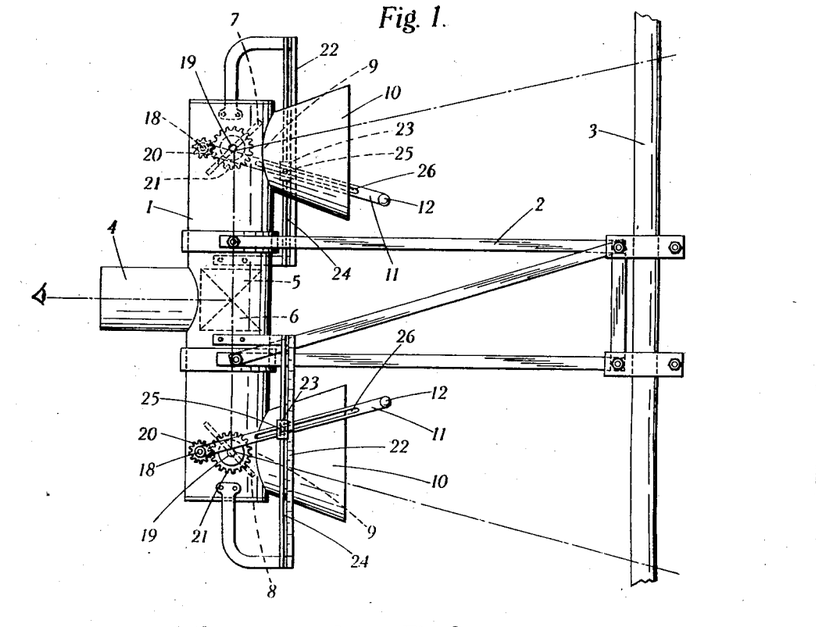
Figure 1 is an elevation of one form of the device of the kind in which the adjustment of reflecting surfaces is angular.

Referring first of all to Figure 1 it will be seen that the instrument comprises a tubular body 1 supported by means of the frame 2 carried by a supporting bar 3, the axis of the body being parallel to the axis of the test piece (not shown in this figure) which, for convenience of description will be assumed to be vertical. On the centre of the body is an eye-piece 4 and within the body and in front of the eye-piece are two reflecting prisms 5 and 6, placed side by side and so arranged that one reflects into the eye-piece an image from the upper end of the tube while the other reflects into the eye-piece an image from the lower end of the tube. Also within the tube are a pair of mirrors 7 and 8, one at each end of the tube, which are so mounted as to turn about an axis transverse to the tube. Opposite each mirror on the side near to the test piece is an opening 9 facing the test piece and preferably provided with a hood 10. With this arrangement, light reflected from the bottom mark on the test piece enters the lower aperture and is reflected upwards by the lower mirror 8 to the prism 6 and similarly light coming from the upper mark of the test piece enters the upper aperture in the side of the tubular body and is reflected by the upper mirror 7 along that body to the prism 5. When the two mirrors are in correct angular position with regard to the marks, the images of these two marks are seen side by side in the eye-piece 4. External handles 12 are provided for tilting the mirrors 7 and 8, respectively, and at the commencement of the test these are set so that the marks are seen in the correct relationship in the eye-piece. As the test proceeds the marks on the test piece move apart, that is the upper mark moves slowly downwards and the lower mark moves very rapidly downwards. By simultaneously tilting the two mirrors, each at an appropriate angular velocity, by means of their handles the images can be maintained in the original relationship and the positions of the handles, or pointers associated therewith, then indicate the positions of the two marks. By continuing the test until the test piece breaks the handles are moved into final positions which show the extension of the test piece at break.

Figure 3:
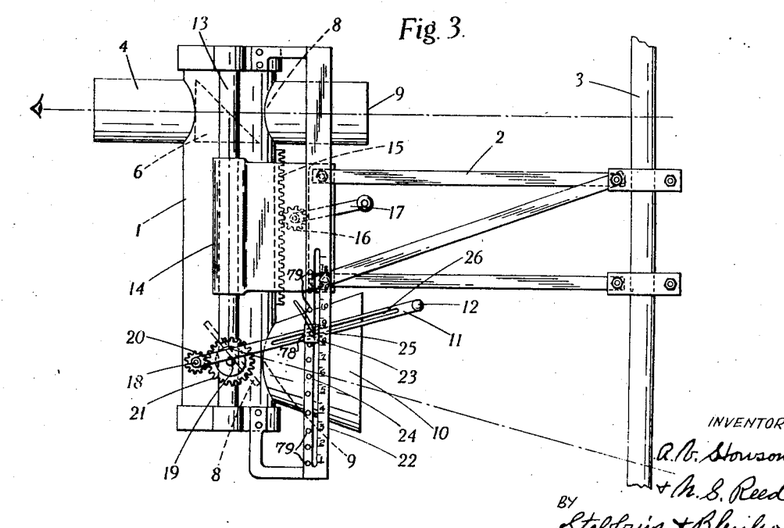
Figure 3 is an elevation of a second form of the device of the kind in which the adjustment of one or more of the reflecting surfaces is angular.

The instrument shown in Figure 3 resembles that shown in Figure 1 in that it also comprises a vertical tubular body 1 having at its lower end a tilting mirror 8 and a side aperture 9 with a hood 10. The eye-piece 4, however, instead of being located centrally of the tubular body 1, is located near the upper end in front of the hooded aperture 9 there, so that, by looking through the eye-piece and aperture, the upper end mark on the test piece can be seen by direct vision. There is, accordingly, in front of the eye-piece only one prism (the prism 6) which receives the image from the mirror 8 and reflects it into the eye-piece, where it is seen alongside the directly viewed image. To make possible the keeping in view of this directly seen image, the tubular body is mounted so that it can slide endwise in its support and an operating handle is provided to produce this endwise movement. In this case, the operator, instead of operating two mirrors, moves with one hand the mirror 8 and with the other hand the body 1 of the instrument. To this end the body carries a pair of guide rods 13, which each slide within a sleeve 14 mounted on the frame 2, and is raised or lowered by operating a handle 17 serving to rotate a pinion 16 mounted on the frame and engaging a rack 15 on the body.

Figure 2:
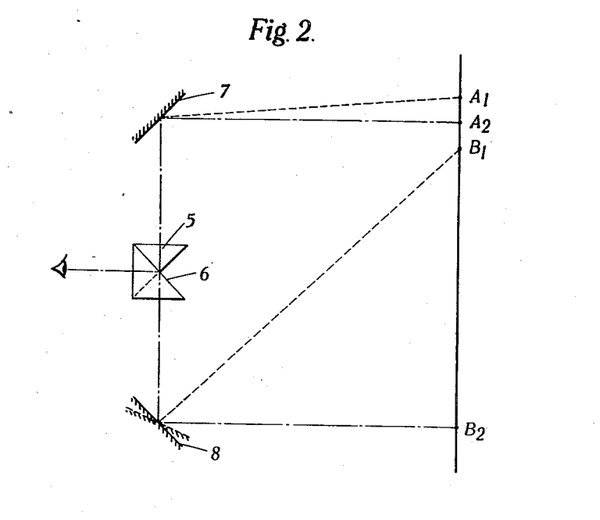
Figure 2 is an optical diagram of the device shown in Figure 1.
Figure 4:
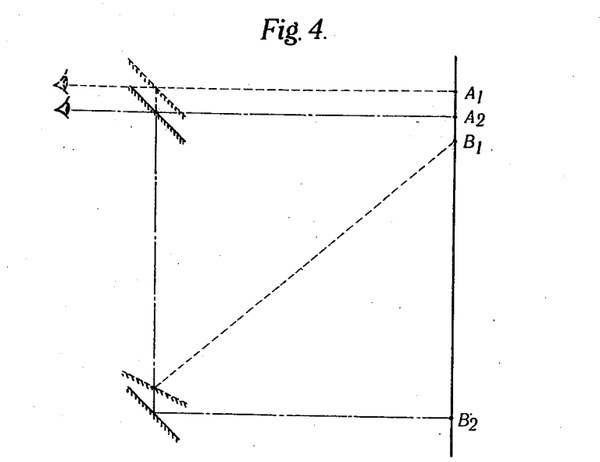
Figure 4 is an optical diagram of the device shown in Figure 3.
Figure 5:
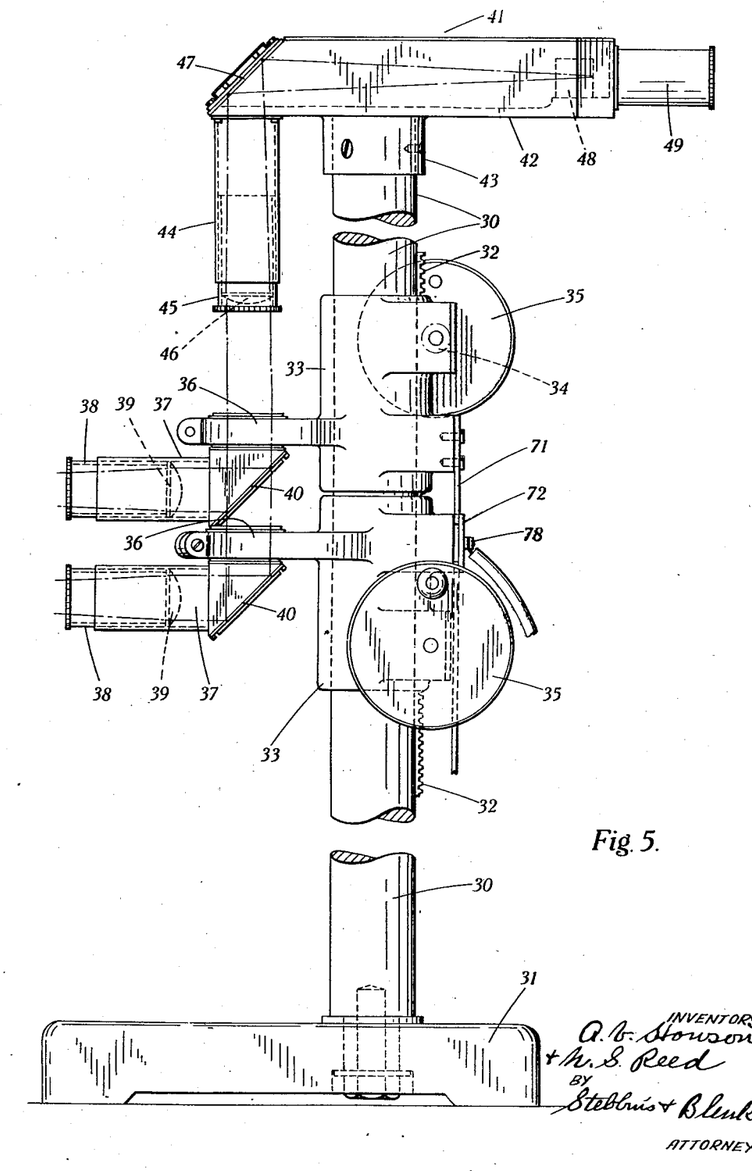
Figure 5 is an elevation of one form of the device of the kind in which the adjustment of one or more of the reflecting surfaces is linear.
Figure 6:
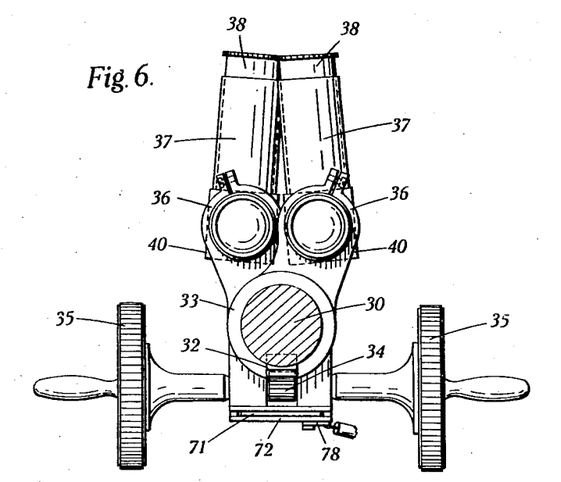
Figure 6 is a plan of the lower part of the instrument shown in Figure 5.
Figure 7:
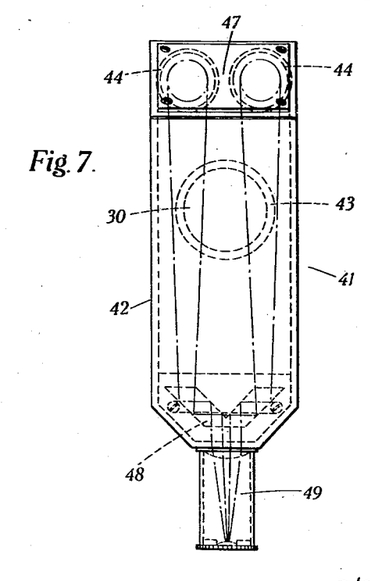
Figure 7 is a plan of the upper part of the instrument shown in Figure 5.

It is advantageous to arrange the two apertures 9 in the body 1 at a distance apart corresponding to the centres of the regions over which accurate observation of the marks on the test piece is desired. In the case of rubber testing, using a test piece with markings initially 2 inches apart, a convenient distance apart for the centres of the apertures is 12 inches, which corresponds to the average spacing of the marks at break. With such an arrangement each tilting mirror is at 45° to the axis of the tubular body when the mark is in the average position at break. On each side of this position, for a range of, say, 10 degrees, the ratio of angular displacement of the mirror to linear displacement of the mark is approximately constant and has maximum value. This will be appreciated by considering Figure 2, where $A_1$ and $B_1$ respectively represent the initial positions of the upper and lower marks on the test piece in a machine of the type shown in Figure 8, and $A_2$ and $B_2$ the positions at break. The upper tilting mirror 7 is shown in the break position and the lower tilting mirror 8 is shown in full lines in the break position and in broken lines in its initial position. From Figure 2 it will also be appreciated that the distance of the axis of the tilting mirror from the test piece should also be chosen so that the required region of accurate observation comes within this advantageous range of tilting. In the case under discussion this result is attained if the distance is approximately 12 inches. Figure 4 is a corresponding diagram for the instrument shown in Figure 3. In this case the initial positions of the rotatable bottom mirror and the fixed top mirror are shown by broken lines.

The actuation of each tilting mirror is advantageously carried out by means of a lever 11 to which the handle 12 is attached. This lever, which is pivoted at 18, drives the shaft 19 on which the mirror is mounted through a pinion 20 and spur wheel 21 constituting a gearing with a reduction ratio of 2:1. With such an arrangement the angular displacement of the lever 11 is the same as the angular displacement of the beam of light from the mark incident on the mirror. Accordingly, distances swept out by the lever on a scale 22 parallel with the test piece are proportional to distances moved by the mark on the test piece, while it is kept under observation in the eye-piece. This permits of the scale being graduated uniformly and of a vernier being used. In a convenient arrangement the vernier 23 slides on a guide 24, which holds it in correct relation to the scale, and the vernier has a projecting pin 25 which engages in a longitudinal slot 26 in the lever. This arrangement is applicable both to the type of instrument shown in Figure 1 and to the modified form shown in Figure 3. In the case where there are two tilting mirrors, it will, of course, be necessary to read the two scales. In the other type, since the scale is carried on the body of the instrument and moves with it in accordance with the direct observation of one of the marks, it will only be necessary to read a single scale to obtain the value of the extension.

Whilst the instruments of the type described with reference to Figures 1 to 4 inclusive are satisfactory, it is preferred to use an instrument of the kind in which angular adjustment of the reflecting surface is avoided. On referring to Figures 5, 6, 7 and 8 it will be seen that the example shown therein comprises a vertical pillar 30 which is located a pre-determined distance from the test piece on a base plate 31. The pillar 30 is of circular cross-section and on the side remote from the test piece carries a rack 32. On the pillar are a pair of sleeves 33 the position of each of which is adjusted by rotation of a pinion 34 mounted therein and engaging the rack 32. Rotation of each pinion is effected by a hand wheel 35 coupled to the spindle of the pinion, the hand wheel controlling the movement of the upper sleeve being located on the opposite side of the pillar 30 to that controlling the movement of the lower sleeve. Each sleeve has a bracket 36 carrying a tubular elbow 37 one outlet of which is directed vertically upwards and the other horizontally towards the test piece, the elbow on one sleeve being off-set to that on the other. Telescoped in the horizontal portion of each elbow is a tube 38 carrying a lens 39 and at the rear of this portion is an inclined mirror 40 or a prism which projects a parallel beam from the lens 39 upwards, through the vertically directed opening to a collecting monocular 41 mounted on the top of the pillar. The collecting monocular comprises a horizontally extending case 42 with a tubular projection 43 depending from its under surface, which receives the upper end of the pillar 30 to which it is anchored by screws. Depending from the end of the case adjacent the test piece and in alignment with the upwardly directed openings of the elbows 37 are a pair of tubes 44 in each of which is telescoped a tube 45 carrying a lens 46 which brings the coaxial upwardly projected parallel beam from the mirror 40 to a focus at the other end of the case 42, the direction of the beam being changed by means of the inclined mirror 47 and the prism 48 the shape of which is such as to position the images from the two lens systems side by side, in which position they are seen through the eye-piece 49.

Figure 8:
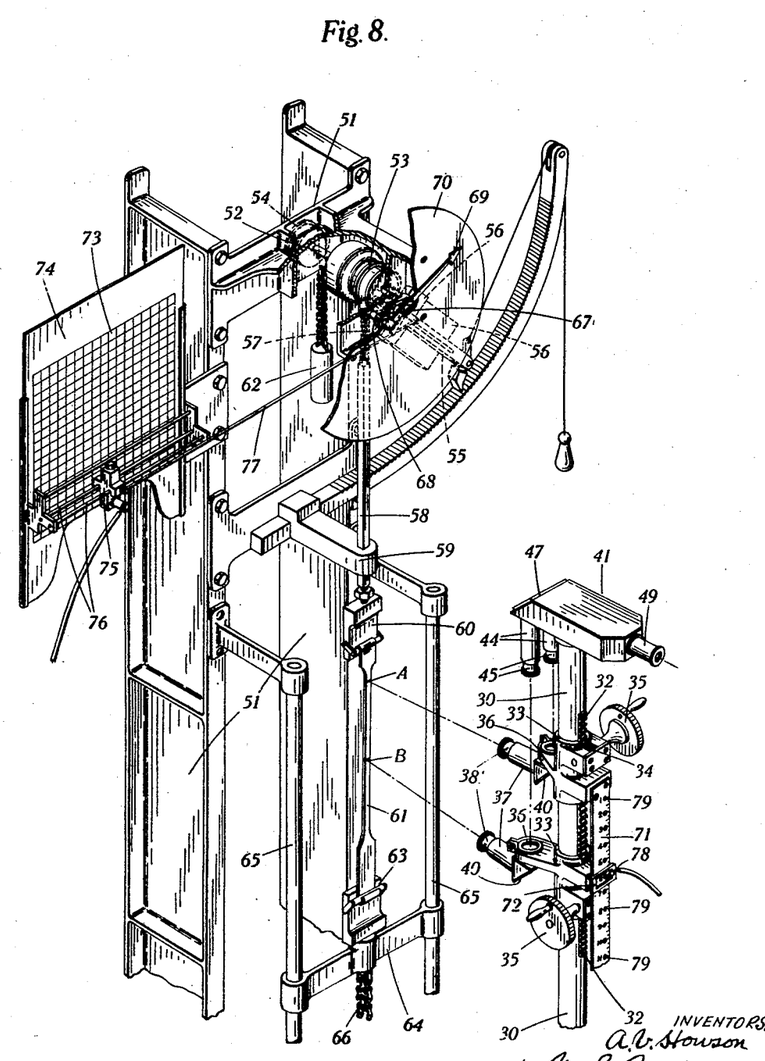
Figure 8 is an isometric view of the device shown in Figures 5, 6 and 7 and of the upper portion of a tensile testing machine with which it is associated.

The manipulation of this second type of instrument during a test made in the machine shown in Figure 8, which is of a known kind, will now be described. The testing machine there shown comprises essentially an upright frame 51 carrying at its upper end a horizontal spindle 52 on which are mounted a pair of drums 53 and 54 and an arm 55 carrying balance weights 56. Coupled to the periphery of the drum 53 by a chain 57 is a rod 58 which slides in a guide 59 and at its lower end carries a gripping device 60 in which the upper end of the test piece 61 is held. Coupled to the periphery of the drum 54 is a counter weight 62. The lower end of the test piece is held in a gripping device 63 carried on a cross arm 64 sliding on guides 65. The test piece is loaded by exerting a downwards pull on the arm 64, generally through the agency of a chain 66 hauled by an electric motor. As the pull is exerted on the test piece the spindle 52 is rotated against the torque exerted by the weighted lever 55, the angular position of which accordingly provides a measure of the load applied. To enable this to be more readily observed the spindle 52 carries a quadrant 67 which engages a pinion 68 on a second spindle which carries a pointer 69 moving over a circular scale 70. At the commencement of the test the two movable lenses 39 are adjusted so that the lower is at the same height as the lower mark B on the test piece and the upper at the same height as the upper mark A, whereupon the two marks are seen side by side in the eye-piece 49. As the test proceeds the marks move apart, the upper mark A moving slowly downwards and the lower mark B moving very rapidly downwards. By rotating the handles 35 in appropriate directions and at appropriate speeds, the sliding lenses can be made to follow the movement of the marks and their images be maintained in the eye-piece in their initial relationship. An indication of the relative movement of the sliding lenses and hence of the extension that has taken place is provided by means of a vertical scale 71 attached to one bracket and a pointer or vernier device 72 attached to the other, the difference between initial and final scale readings being a measure of the extension of the test piece at break.

In the method of direct observation of the test piece with the aid of a ruler, as previously practiced and described herein, stress-strain curves have been obtained by marking a chart by means of an electric spark which is caused to pass between two electrodes, one located on each side of the chart and one having its position automatically adjusted in accordance with the load, by the operator as the elongation reaches each one of a series of pre-determined values. Figure 8 shows such an arrangement. The chart 73 is mounted on an earthed backing plate 74 and the electrode, carried on the slide block 75 mounted on guide rods 76, is caused to move horizontally by coupling the block 75 by a link 77 to the weighted arm 55. With the extensometer according to the present invention the marking of such a stress-strain chart may be effected automatically. This is attained by associating with the vernier 23 of Figure 3 or the indicating pointer 72 of Figure 8 an electric contact 78 which, as it sweeps over the scale 22 or 71 respectively makes contact in succession with each of a series of fixed contact studs 79 positioned along the scale. Accordingly, as the electrode moves horizontally across the chart, in accordance with the applied load on the test piece the chart is marked at intervals by a spark discharge each time the sliding contact 78 makes contact with a stud 79 and completes a high tension circuit, including the electrode, the backing plate 74 and the spark gap. In this way a record of the load at each of a series of values of elongation is automatically obtained. Since these values are determined by the position of the studs 79 on the scale, they may be varied to suit different materials under test by adjusting the position of the contacts on the scale. This recording device can also be employed with an instrument of the kind shown in Figure 1 in which two scales are required, but in this case two electrodes are necessary, one for each scale. From the chart two scale/load curves may be drawn. From these the extension at various loads can be obtained.

Both types of instrument may, if required, be equipped with a source of light which may be directed upon the sample in order to facilitate the observation of the moving marks.

Although the invention has been described with particular reference to the testing of rubber, it will be seen that it is also applicable to the testing of other materials and to cases where the extension is less in proportion than in the case of rubber. In such cases it may be advantageous to modify the instrument in some respects, for instance, with instruments of the type shown in Figures 1 and 3, by increasing the ratio of the reduction gearing between the operating handle and the tilting mirror or by choosing different values for the separation of the two mirrors, or the mirror and the eye-piece, and for the distance of the axis of the body of the instrument from the test piece. In instruments of the type shown in Figures 5 to 8 the gear ratio of the rack and pinion gear can be varied or the movement can be controlled by a screw thread arrangement and measured by a micrometer incorporated therein.

What we claim as our invention is:

1. An extensometer for measuring the extension up to and at breaking point of a loaded test piece of rubber or like elastic material having two reference marks, comprising a system of reflecting surfaces arranged to bring the images of the two marks into view in close and defined proximity, said system including a stationary eye-piece, a pair of mirrors, one for each mark, and means for adjusting each of said mirrors in a linear direction during a test, whereby to keep the images in view in the said eye-piece, and means for indicating the extent of movement of one mirror relative to the other mirror.

2. An extensometer for measuring the extension of a loaded test piece of rubber or like elastic material having two reference marks, comprising a support, a pair of tubular elbows mounted on said support and movable thereon in a direction parallel with the test piece and each having one outlet directed toward the test piece, a lens housed in each elbow for converting an incident beam of light from one of the reference marks into a parallel beam, a mirror in each elbow, inclined with respect to said lens, for projecting the parallel beam from said lens through the other outlet of said elbow in a direction parallel with the test-piece, a collecting monocular for collecting the projected beams from said mirrors, said monocular comprising a pair of lenses, a pair of inclined mirrors and a prism, whereby the projected beams are brought to focus and the images of the reference marks positioned side by side, an eye-piece for viewing the images so positioned, means for adjusting the position of said elbows on said support whereby to maintain the images in view during the extension of the test piece, and means for indicating the relative movement apart of the two elbows.

3. An extensometer for measuring the extension of a loaded test piece of rubber or like elastic material, comprising an optical device for bringing the images of two reference marks on the test piece into view in an eye-piece in close and defined proximity, means for adjusting said device to maintain the image of one mark in said eye-piece during extension of the test piece, additional means for adjusting said device to maintain the image of the other mark in said eye-piece during extension of the test piece, an electric switch mounted on said extensometer and comprising a sliding contact and a series of contact studs swept by said sliding contact, means for coupling said adjusting means to said sliding contact whereby to impart thereto a movement corresponding to the movement of the first said mark, and means for coupling said additional adjusting means to said series of contact studs whereby to impart thereto a movement corresponding to the movement of said other mark, thereby to close said switch at predetermined values of extension of the test piece.

4. An extensometer for measuring the extension of a loaded test piece of rubber or like elastic material having two reference marks, comprising an optical device for bringing images of the two marks into view in close and defined proximity and an electric switch for controlling an electrically operated extension indicating device, said optical device including an eye-piece directed towards the test piece, means for moving said eye-piece in a line substantially parallel with the test piece to maintain direct observation of one of the marks, a tilting mirror on which light from the other of said marks is directly incident and by which it is reflected into the eye-piece, and means for adjusting said mirror whereby to maintain in view in said eye-piece a reflected image of that other mark, and said switch comprising two members, one being a sliding contact and the other a series of contact studs swept thereby, one of said switch members being mounted on said movable eye-piece and the other mechanically coupled to said mirror adjusting means whereby it is moved in a direction parallel to said first switch member at a rate proportional to the angular movement of said mirror.

5. An extensometer for measuring the extension of a loaded test piece of rubber or like elastic material having two reference marks, comprising an optical device including an eye-piece and a pair of mirrors, one for each mark, for bringing the images of the two marks into view in the eye-piece, means for adjusting each of said mirrors in a linear direction whereby to maintain the images in view in said eye-piece during extension of the test piece, and an electric switch for controlling an electrically operated indicating device, said switch comprising a sliding contact coupled to one of said mirrors and constrained to move therewith and a series of contact studs extending in the direction of movement of and mechanically coupled to the other of said mirrors and constrained to move therewith, whereby said sliding contact sweeps over said series of contact studs during the linear adjustment of said mirrors.

6. An extensometer as specified in claim 2 wherein the said adjusting means comprises a pair of sleeves each slidable on the support and each carrying one of said elbows, a rack extending longitudinally of the support, a pinion mounted on each sleeve and engaging said rack and means for rotating said pinions thereby to adjust the positions of said elbows, and the said indicating means comprises a scale secured to one of said sleeves and extending longitudinally of said support and an indicating device secured to the other of said sleeves and cooperating with said scale.

7. An extensometer for measuring the extension of a loaded test piece of rubber or like elastic material having two reference marks, comprising a support, a system of reflecting surfaces mounted on said support and arranged to bring the images of the two marks into view in close and defined proximity, said system including an eye-piece directed towards the test piece, means for moving said eye-piece on said support whilst maintaining constant the angle between said eye-piece and the direction of extension of the test piece, whereby to maintain direct observation of one of the marks, a mirror on which light from the other of said marks is directly incident, and means for tilting said mirror on said support to maintain in view in said eye-piece the reflected image of the other mark.

8. An extensometer for measuring the extension of a loaded test piece of rubber or like elastic material having two reference marks, comprising a support and a system of reflecting surfaces mounted thereon and arranged to bring the images of the two marks into view in an eye-piece in close and defined proximity, said system including a tilting mirror on which light from one of said marks is directly incident, a rectilinear scale extending parallel with the direction of extension of said test piece, a pivoted lever sweeping across said scale, and means comprising a two to one reduction gearing coupling said lever to said tilting mirror, whereby angular movement of said lever about its pivot drives said mirror at half the angular velocity of said lever whereby the distances swept out on said scale are a constant proportion of the distances moved by the mark on the test piece of which the image is reflected by said mirror into the eye-piece.

9. An extensometer for measuring the extension of a loaded test piece of rubber or like elastic material having two reference marks, comprising a support an optical device mounted on said support for bringing the images of the two marks into view in close and defined proximity, means for adjusting said device as a whole on its support to maintain the image of one of said marks in view during the extension of the test piece, means for adjusting an element of said device to maintain the image of the other mark in view in close and defined proximity to the image of the first mark during extension of the test piece, a scale and means for adjusting the position thereof in accordance with setting of one of said adjusting means and an indicator, of which the position is controlled by the other of said adjusting means, cooperating with said scale whereby to indicate the extension of said test piece.

10. An extensometer for measuring the extension of a loaded test piece having two reference marks, comprising a support, and a system of reflecting surfaces adjustably positioned on said support and arranged to bring the images of the two marks into view in close and defined proximity, said system including a tilting mirror, means including a hand actuable pivoted lever and reduction gearing coupling said lever to said tilting mirror for continuously adjusting the angular position of said mirror on said support during a test to maintain the image of the said one of said marks in view in said eye-piece, a scale, an indicating device slidable along a support therefor and movable along said scale, means actuated by said lever for moving said indicating device along said scale, the last said means comprising a projection on said device engaging a slot extending longitudinally in said lever thereby to cause said device to be moved along said scale by angular displacement of said lever.

11. An extensometer for measuring the extension of a loaded test piece having two reference marks, comprising a support a system of reflecting surfaces adjustably positioned on said support and arranged to bring the images of the two marks into view in close and defined proximity, said system including an eye-piece movable on said support in a line parallel with the test piece for maintaining direct observation of one of the marks, a tilting mirror on which light from the other of said marks is incident and means including a hand actuable pivoted lever and reduction gearing coupling said lever to said tilting mirror for adjusting the angular position of said mirror on said support during a test to maintain the image of the said other mark in view in said movable eye-piece, a rectilinear scale extending in a direction substantially parallel with the test piece and constrained to move endwise with said eye-piece, an indicating device movable along said scale, a projection on said device engaging in a slot extending longitudinally in said lever whereby to cause said device to be moved along said scale by angular displacement of said lever.

12. An extensometer for measuring the extension of a loaded test piece of rubber or like elastic material, comprising an optical device for bringing the images of two reference marks on the test piece into view in an eye-piece in close and defined proximity, means for adjusting said device to maintain the image of one mark in said eye-piece during the extension of the test piece, additional means for adjusting said device to maintain the image of the other mark in said eye-piece during the extension of the test piece, and means for controlling an electrically operated, extension indicating device, the last said means comprising a switch having a single contact movable relative to a plurality of spaced contacts, and means for moving said single contact and said plurality of contacts along a common path in response to movement of said adjusting means to maintain said images in the eye-piece whereby the spaced contacts are successively engaged by said single contact.

13. An extensometer for measuring the extension of a loaded test piece of rubber or like elastic material, comprising an optical device for bringing the images of two reference marks on the test piece into view in close and defined proximity, means for adjusting said device to maintain the image of one mark in view during the extension of the test piece, additional means for adjusting said device to maintain the image of the other mark in view in close and defined proximity to the image of the first mark during the extension of the test piece, means for controlling an electrically operated, extension indicating device, the last said means comprising a switch having a single contact movable relative to a plurality of spaced contacts, and means for moving said single contact and said plurality of contacts along a common path in response to movement of said adjusting means to maintain said images in view in close proximity to each other whereby the spaced contacts are successively engaged by said single contact.

14. An extensometer for measuring the extension of a loaded test piece or rubber or like elastic material having two reference marks, comprising an optical device for bringing the images of the two marks into view in close and defined proximity, means for adjusting said device to maintain the image of one of said marks in view during the extension of the test piece, a tilting mirror constituting an element of said optical device and directed towards the test piece and means for adjusting said mirror to maintain the image of the other mark in view in close and defined proximity to the image of the first mark during extension of the test piece, and means for controlling an electrically operated, extension indicating device, the last said means comprising a switch having a single contact movable relative to a plurality of spaced contacts, and means for moving said single contact and said plurality of contacts along a common path in response to movement of said adjusting means to maintain said images in view in close proximity to each other whereby the spaced contacts are successively engaged by said single contact.

15. An extensometer for measuring the extension of a loaded test piece of rubber or like elastice material having two reference marks, comprising a support, an optical device mounted on said support for bringing the images of the two marks into view in close and defined proximity, means for adjusting said device as a whole relative to said support to maintain the image of one of said marks in view during the extension of the test piece, said device comprising a reflecting surface directed towards the loaded test piece and capable of rapid angular adjustment through a wide angle about an axis substantially at right angles to the direction of adjustment of the device relative to said support, and means for adjusting said reflecting surface to maintain the image of the other mark in view in close and defined proximity to the image of the first mark during extension of the test piece.

ARTHUR VICTOR HOWSON.
NEVILLE STANLEY REED.